United States Patent
Sengupta et al.

(10) Patent No.: US 12,058,674 B2
(45) Date of Patent: Aug. 6, 2024

(54) UPLINK ASPECTS FOR NARROWBAND INTERNET OF THINGS

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US)

(73) Assignee: QUALCOMM Incorporated, San Diego, CA (US)

( * ) Notice: Subject to any disclaimer, the term of this patent is extended or adjusted under 35 U.S.C. 154(b) by 331 days.

(21) Appl. No.: 17/171,721

(22) Filed: Feb. 9, 2021

(65) Prior Publication Data

US 2021/0250968 A1 Aug. 12, 2021

Related U.S. Application Data

(60) Provisional application No. 62/972,612, filed on Feb. 10, 2020.

(51) Int. Cl.
| | |
|---|---|
| *H04W 72/1268* | (2023.01) |
| *H04W 4/70* | (2018.01) |
| *H04W 52/26* | (2009.01) |
| *H04W 74/00* | (2009.01) |
| *H04W 74/0833* | (2024.01) |

(52) U.S. Cl.
CPC ..... *H04W 72/1268* (2013.01); *H04W 52/262* (2013.01); *H04W 74/004* (2013.01); *H04W 74/0833* (2013.01); *H04W 4/70* (2018.02)

(58) Field of Classification Search
CPC . H04W 72/1268; H04W 4/70; H04W 52/262; H04W 74/004; H04W 74/0833
See application file for complete search history.

(56) References Cited

U.S. PATENT DOCUMENTS

| | | | |
|---|---|---|---|
| 2011/0317643 A1 | 12/2011 | Gaal et al. | |
| 2015/0312071 A1* | 10/2015 | Chen | H04L 1/0003 |
| | | | 370/329 |

(Continued)

FOREIGN PATENT DOCUMENTS

| | | |
|---|---|---|
| EP | 3422788 A1 | 1/2019 |
| WO | 2015164251 A1 | 10/2015 |
| WO | 2019150889 A1 | 8/2019 |

(Continued)

OTHER PUBLICATIONS

Hoglund et al. "3GPP Release 15 Early Data Transmission" IEEE Communications Standards Magazine Jun. 2018 (Year: 2018).*

(Continued)

*Primary Examiner* — Basil Ma

(74) *Attorney, Agent, or Firm* — Patterson & Sheridan LLP

(57) ABSTRACT

Certain aspects of the subject matter described in this disclosure can be implemented in a method for wireless communication. The method generally includes receiving a configuration message for narrowband internet of things (NB-IoT) communication, the configuration message indicating one or more parameters for uplink transmission using a modulation and coding scheme (MCS) associated with a modulation order of at least four, generating the uplink transmission, and sending the uplink transmission in accordance with the one or more parameters.

33 Claims, 9 Drawing Sheets

(56) References Cited

U.S. PATENT DOCUMENTS

2019/0045554 A1* 2/2019 Ye .................. H04W 74/0833
2021/0045092 A1 2/2021 Gotoh et al.

FOREIGN PATENT DOCUMENTS

WO 2019193427 A1 10/2019
WO 2019242665 A1 12/2019

OTHER PUBLICATIONS

R1-1910528 Sierra Wireless "LTE-M Preconfigured UL Resources Feature Lead Summary RAN1 #98bis" 3GPP WG1 #98bis Chongqing Oct. 14-20, 2019 (Year: 2019).*
R2-1805178 Ericsson "TB sizes and UL grant for Msg3" 3GPP WG2 #101bis Sanya Apr. 16-20, 2018 (Year: 2018).*
R2-1817940 "Pre-configured UL Resources Design Considerations" 3GPP WG2 #104 Spokane Nov. 12-16, 2018. (Year: 2018).*
International Search Report and Written Opinion—PCT/US2021/017423—ISA/EPO—Jul. 23, 2021.
"NB_IoT_eMTC_enh Work Area Email Discussion—Phase 2," 3GPP Draft, RP-192877, 3rd Generation Partnership Project (3GPP), Mobile Competence Centre, 650, Route Des Lucioles, F-06921, Sophia-Antipolis Cedex, France, Dec. 2, 2019 (Dec. 2, 2019), XP051834479, 28 pages, Retrieved from the Internet: URL: https://ftp.3gpp.org/tsg_ran/TSG_RAN/TSGR_86/Docs/RP-192877.zip NB-IoT_eMTC_enh email discussion phase 2—all.docx—[retrieved on Dec. 2, 2019], p. 4, line 55-line 65.
Ericsson: "TB Sizes and UL Grant for Msg3", 3GPP Draft, 3GPP TSG-RAN WG2 #101bis, R2-1805178—TB Sizes and UL Grant for MSG3, 3rd Generation Partnership Project (3GPP), Mobile Competence Centre, 650, Route Des Lucioles, F-06921, Sophia-Antipolis Cedex, France, vol. RAN WG2, No. Sanya, P.R. of China; Apr. 16, 2018-Apr. 20, 2018, Apr. 14, 2018 (Apr. 14, 2018), XP051428854, 12 pages, Retrieved from the Internet: URL:http://www.3gpp.org/ftp/Meetings%5F3GPP%5FSYNC/RAN2/Docs/ [retrieved on Apr. 14, 2018], Sections 2 and 3, p. 3, line 8-line 25.
MCC Support: "Draft Report of 3GPP TSG RAN WG1 #99 V0.1.0 (Reno, USA, Nov. 18-22, 2019)", 3GPP Draft; Draft_Minutes_Report_RAN1#99_V010, 3rd Generation Partnership Project (3GPP), Mobile Competence Centre, 650, Route Des Lucioles, F-06921, Sophia-Antipolis Cedex, France, vol. RAN WG1, No. Athens, Greece, Feb. 24, 2020-Feb. 28, 2020, Nov. 27, 2019 (Nov. 27, 2019), XP051831467, Retrieved from the Internet : URL: https://ftp.3gpp.org/tsg_ran/WG1_RL1/TSGR1_99/Report/Draft_Minutes_report_RAN1%2399_v010.zip.
Partial International Search Report—PCT/US2021/017423—ISA/EPO—May 28, 2021.
Sierra Wireless: "LTE-M Preconfigured UL Resources Feature Lead Summary RAN1 #98bis ", 3GPP Draft, 3GPP TSG RAN WG1 #98bis, R1-1910528 PUR Summary RAN1 #98BIS , 3rd Generation Partnership Project (3GPP), Mobile Competence Centre, 650, Route Des Lucioles, F-06921, Sophia-Antipolis Cedex, France, vol. RAN WG1, No. Chongqing, China; Oct. 14, 2019-Oct. 20, 2019, Oct. 22, 2019 (Oct. 22, 2019), XP051798588, 16 pages, Retrieved from the Internet : URL: https://ftp.3gpp.org/tsg_ran/WG1_RL1/TSGR1_98b/Docs/R1-1910528.zip.
Mediatek Inc: "Rel-17 16QAM support for NB-Iot", 3GPP TSG RAN WG Meeting #86, RP-192672, Discussion and Decision, Dec. 9-12, 2019, Sitges, Spain, pp. 1-7.

* cited by examiner

700

| MCS Index $I_{MCS}$ | Modulation Order $Q_m$ | TBS Index $I_{TBS}$ |
|---|---|---|
| 0 | 2 | 0 |
| 1 | 2 | 1 |
| 2 | 2 | 2 |
| 3 | 2 | 3 |
| 4 | 2 | 4 |
| 5 | 2 | 5 |
| 6 | 2 | 6 |
| 7 | 2 | 7 |
| 8 | 2 | 8 |
| 9 | 2 | 9 |
| 10 | 4 | 9 |
| 11 | 4 | 10 |
| 12 | 4 | 11 |
| 13 | 4 | 12 |
| 14 | 4 | 13 |
| 15 | 4 | 14 |
| 16 | 4 | 15 |

*FIG. 7A*

UPLINK ASPECTS FOR NARROWBAND INTERNET OF THINGS

CROSS-REFERENCE TO RELATED APPLICATION

This application claims benefit of and priority to U.S. Provisional Application No. 62/972,612, filed Feb. 10, 2020, which is hereby assigned to the assignee hereof and hereby expressly incorporated by reference herein in its entirety as if fully set forth below and for all applicable purposes.

BACKGROUND

Field of the Disclosure

Aspects of the present disclosure relate to wireless communications, and more particularly, to techniques for narrowband-internet of things (NB-IoT).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (e.g., 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved narrowband-internet of things (NB-IoT) communication.

Certain aspects of the subject matter described in this disclosure can be implemented in a method for wireless communication. The method generally includes receiving a configuration message for narrowband internet of things (NB-IoT) communication, the configuration message indicating one or more parameters for uplink transmission using a modulation and coding scheme (MCS) associated with a modulation order of at least four, generating the uplink transmission, and sending the uplink transmission in accordance with the one or more parameters.

Certain aspects of the subject matter described in this disclosure can be implemented in a method for wireless communication. The method generally includes generating a configuration message for NB-IoT communication, the configuration message indicating one or more parameters for uplink transmission using a MCS associated with a modulation order of at least four, transmitting the configuration message, and receiving the uplink transmission in accordance with the one or more parameters.

Certain aspects of the subject matter described in this disclosure can be implemented in an apparatus for wireless communication. The apparatus generally includes a receiver configured to receive a configuration message for NB-IoT communication, the configuration message indicating one or more parameters for uplink transmission using a MCS associated with a modulation order of at least four, a processing system configured to generate the uplink transmission, and a transmitter configured to send the uplink transmission in accordance with the one or more parameters.

Certain aspects of the subject matter described in this disclosure can be implemented in an apparatus for wireless communication. The apparatus generally includes a processing system configured to generate a configuration message for NB-IoT communication, the configuration message indicating one or more parameters for uplink transmission using a MCS associated with a modulation order of at least four, a transmitter configured to transmit the configuration message, and a receiver configured to receive the uplink transmission in accordance with the one or more parameters.

Certain aspects of the subject matter described in this disclosure can be implemented in an apparatus for wireless communication. The apparatus generally includes means for receiving a configuration message for NB-IoT communication, the configuration message indicating one or more parameters for uplink transmission using a MCS associated with a modulation order of at least four, means for generating the uplink transmission, and means for sending the uplink transmission in accordance with the one or more parameters.

Certain aspects of the subject matter described in this disclosure can be implemented in an apparatus for wireless communication. The apparatus generally includes means for generating a configuration message for NB-IoT communication, the configuration message indicating one or more parameters for uplink transmission using a MCS associated with a modulation order of at least four, means for transmitting the configuration message; and means for receiving the uplink transmission in accordance with the one or more parameters.

Certain aspects of the subject matter described in this disclosure can be implemented in a computer-readable medium having instructions stored thereon to cause an apparatus to receive a configuration message for NB-IoT communication, the configuration message indicating one or more parameters for uplink transmission using a MCS associated with a modulation order of at least four, generate the uplink transmission, and send the uplink transmission in accordance with the one or more parameters.

Certain aspects of the subject matter described in this disclosure can be implemented in a computer-readable medium having instructions stored thereon to cause an apparatus to generate a configuration message for NB-IoT communication, the configuration message indicating one or more parameters for uplink transmission using a MCS associated with a modulation order of at least four, transmit the configuration message, and receive the uplink transmission in accordance with the one or more parameters.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

FIG. 7A is a table indicating a mapping of candidate modulation and coding schemes (MCSs) to transport block sizes (TBSs), in accordance with certain aspects of the present disclosure.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
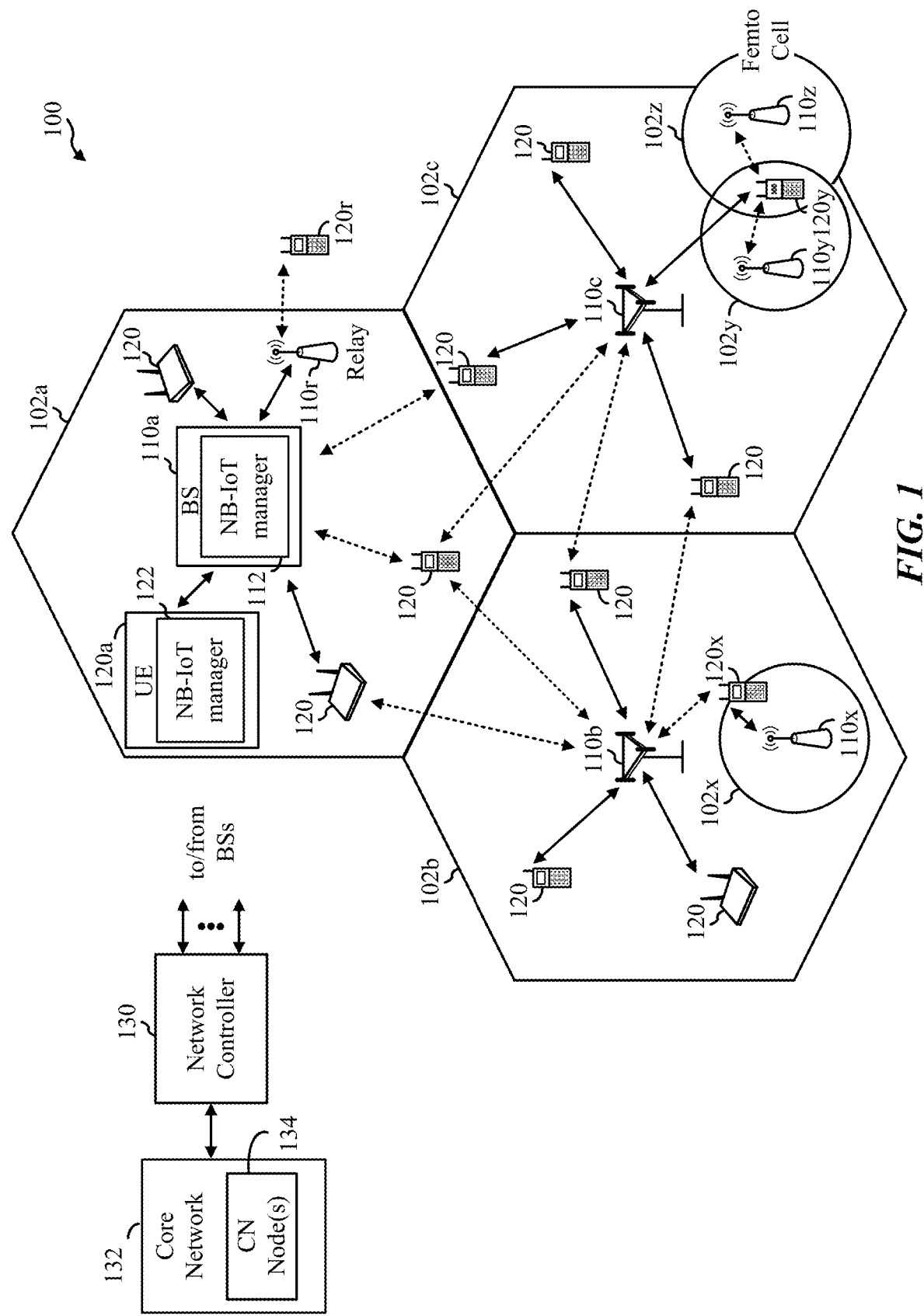
FIG. 1 is a block diagram conceptually illustrating an example telecommunications system, in accordance with certain aspects of the present disclosure.

Aspects of the present disclosure provide apparatus, methods, processing systems, and computer readable mediums for narrow-band internet of things (NB-IoT) communication.

The following description provides examples of NB-IoT in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs.

The techniques described herein may be used for various wireless networks and radio technologies. While aspects may be described herein using terminology commonly associated with 3G, 4G, and/or new radio (e.g., 5G NR) wireless technologies, aspects of the present disclosure can be applied in other generation-based communication systems.

NR access may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe. NR supports beamforming and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

FIG. 1 illustrates an example wireless communication network 100 in which aspects of the present disclosure may be performed. For example, the wireless communication network 100 may be an NR system (e.g., a 5G NR network). As shown in FIG. 1, the wireless communication network 100 may be in communication with a core network 132. The core network 132 may in communication with one or more base station (BSs) 110 and/or user equipment (UE) 120 in the wireless communication network 100 via one or more interfaces.

As illustrated in FIG. 1, the wireless communication network 100 may include a number of BSs 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another and/or to one or more other BSs or network nodes (not shown) in wireless communication network 100 through various types of backhaul interfaces (e.g., a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. A network controller 130 may couple to a set of BSs 110 and provide coordination and control for these BSs 110 (e.g., via a backhaul).

The BSs 110 communicate with UEs 120a-y (each also individually referred to herein as UE 120 or collectively as UEs 120) in the wireless communication network 100. The UEs 120 (e.g., 120x, 120y, etc.) may be dispersed throughout the wireless communication network 100, and each UE 120 may be stationary or mobile. Wireless communication network 100 may also include relay stations (e.g., relay station 110r), also referred to as relays or the like, that receive a transmission of data and/or other information from an upstream station (e.g., a BS 110a or a UE 120r) and sends a transmission of the data and/or other information to a downstream station (e.g., a UE 120 or a BS 110), or that relays transmissions between UEs 120, to facilitate communication between devices.

According to certain aspects, the BSs 110 and UEs 120 may be configured for NB-IoT communication. As shown in FIG. 1, the BS 110a includes an NB-IoT manager 112. The NB-IoT manager 112 may be configured to configure narrowband uplink transmission using a modulation and coding scheme (MCS) associated with a modulation order of at least four, in accordance with aspects of the present disclosure. As shown in FIG. 1, the UE 120a includes an NB-IoT manager 122. The NB-IoT manager 122 may be configured to perform narrowband uplink transmission using an MCS associated with a modulation order of at least four, in accordance with aspects of the present disclosure.

Figure 2:
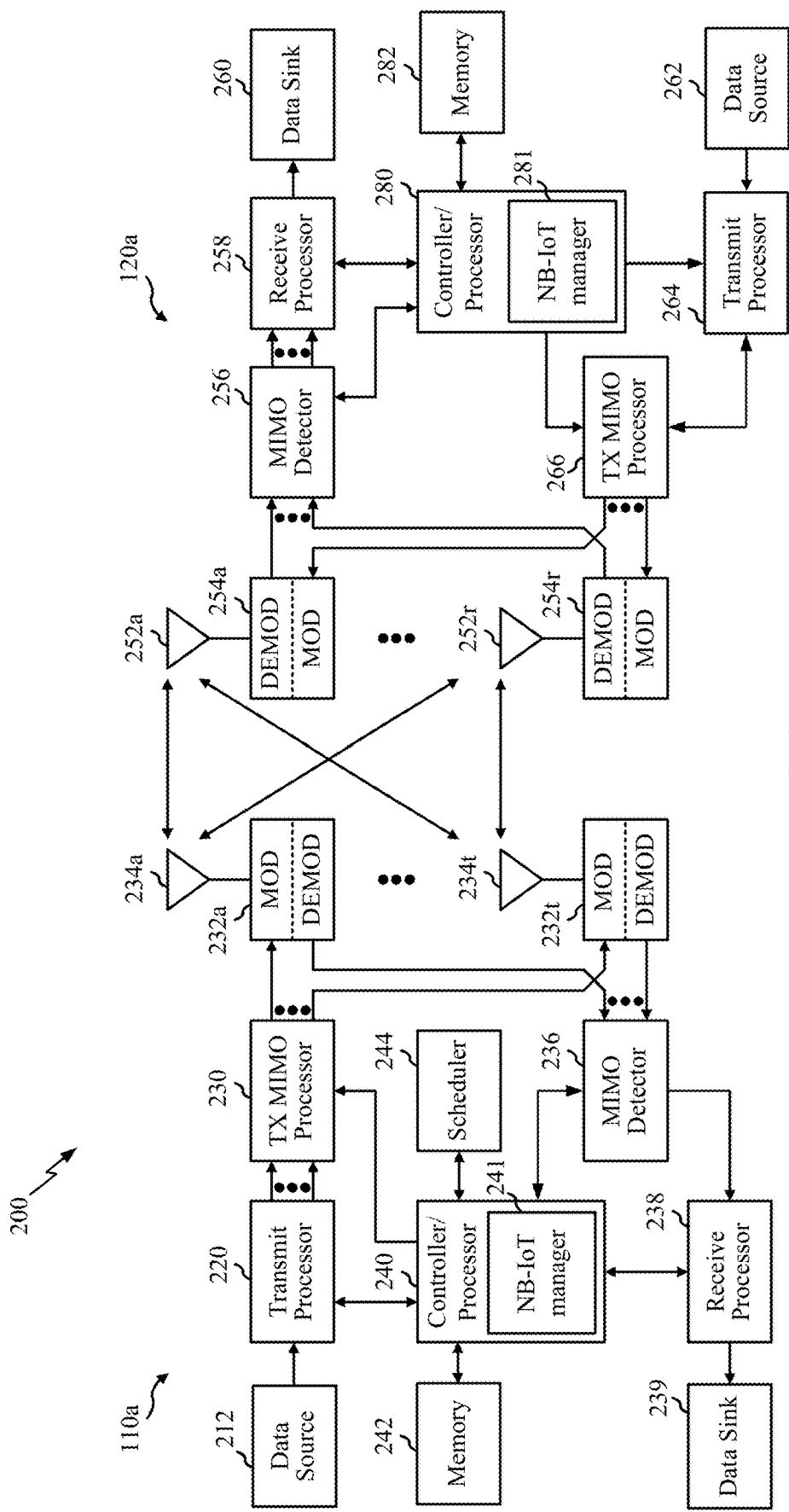
FIG. 2 is a block diagram conceptually illustrating a design of an example a base station (BS) and user equipment (UE), in accordance with certain aspects of the present disclosure.

FIG. 2 illustrates example components of BS 110a and UE 120a (e.g., in the wireless communication network 100 of FIG. 1), which may be used to implement aspects of the present disclosure.

At the BS 110a, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a physical downlink shared channel (PDSCH), a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), and channel state information reference signal (CSI-RS). A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a-232t. Each modulator 232 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 232a-232t may be transmitted via the antennas 234a-234t, respectively.

At the UE 120a, the antennas 252a-252r may receive the downlink signals from the BS 110a and may provide received signals to the demodulators (DEMODs) in transceivers 254a-254r, respectively. Each demodulator 254 may condition (e.g., filter, amplify, downconvert, and digitize) a respective received signal to obtain input samples. Each demodulator may further process the input samples (e.g., for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH) from the controller/processor 280. The transmit processor 264 may also generate reference symbols for a reference signal (e.g., for the sounding reference signal (SRS)). The symbols from the transmit processor 264 may be precoded by a TX MIMO processor 266 if applicable, further processed by the modulators in transceivers 254a-254r (e.g., for SC-FDM, etc.), and transmitted to the BS 110a. At the BS 110a, the uplink signals from the UE 120a may be received by the antennas 234, processed by the modulators 232, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. A scheduler 244 may schedule UEs for data transmission on the downlink and/or uplink.

Antennas 252, processors 266, 258, 264, and/or controller/processor 280 of the UE 120a and/or antennas 234, processors 220, 230, 238, and/or controller/processor 240 of the BS 110a may be used to perform the various techniques and methods described herein. For example, as shown in FIG. 2, the controller/processor 240 of the BS 110a has an NB-IoT manager 241 that may be configured for configuring narrowband uplink transmission using an MCS associated with a modulation order of at least four, according to aspects described herein. As shown in FIG. 2, the controller/processor 280 of the UE 120a has an NB-IoT manager 281 that may be configured for performing narrowband uplink transmission using an MCS associated with a modulation order of at least four, according to aspects described herein. Although shown at the controller/processor, other components of the UE 120a and BS 110a may be used to perform the operations described herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The minimum resource allocation, called a resource block (RB), may be 12 consecutive subcarriers. The system bandwidth may also be partitioned into subbands. For example, a subband may cover multiple RBs. NR may support a base subcarrier spacing (SCS) of 15 KHz and other SCS may be defined with respect to the base SCS (e.g., 30 kHz, 60 kHz, 120 kHz, 240 kHz, etc.).

Figure 3:
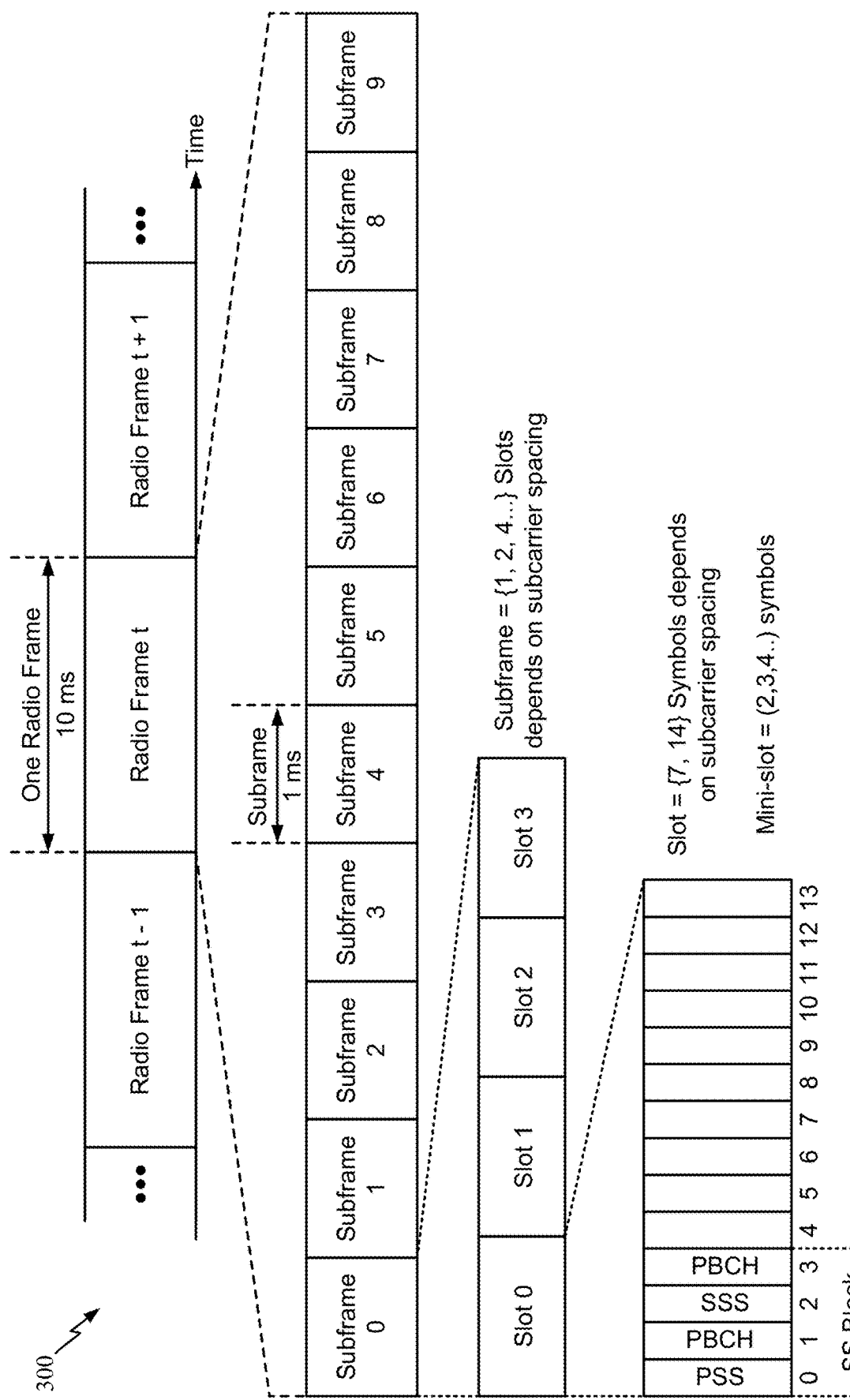
FIG. 3 is an example frame format for new radio (NR), in accordance with certain aspects of the present disclosure.

FIG. 3 is a diagram showing an example of a frame format 300 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots (e.g., 1, 2, 4, 8, 16, . . . slots) depending on the SCS. Each slot may include a variable number of symbol periods (e.g., 7 or 14 symbols) depending on the SCS. The symbol periods in each slot may be assigned indices. A mini-slot, which may be referred to as a sub-slot structure, refers to a transmit time interval having a duration less than a slot (e.g., 2, 3, or 4 symbols). Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

Example Random Access Procedure

Figure 4:
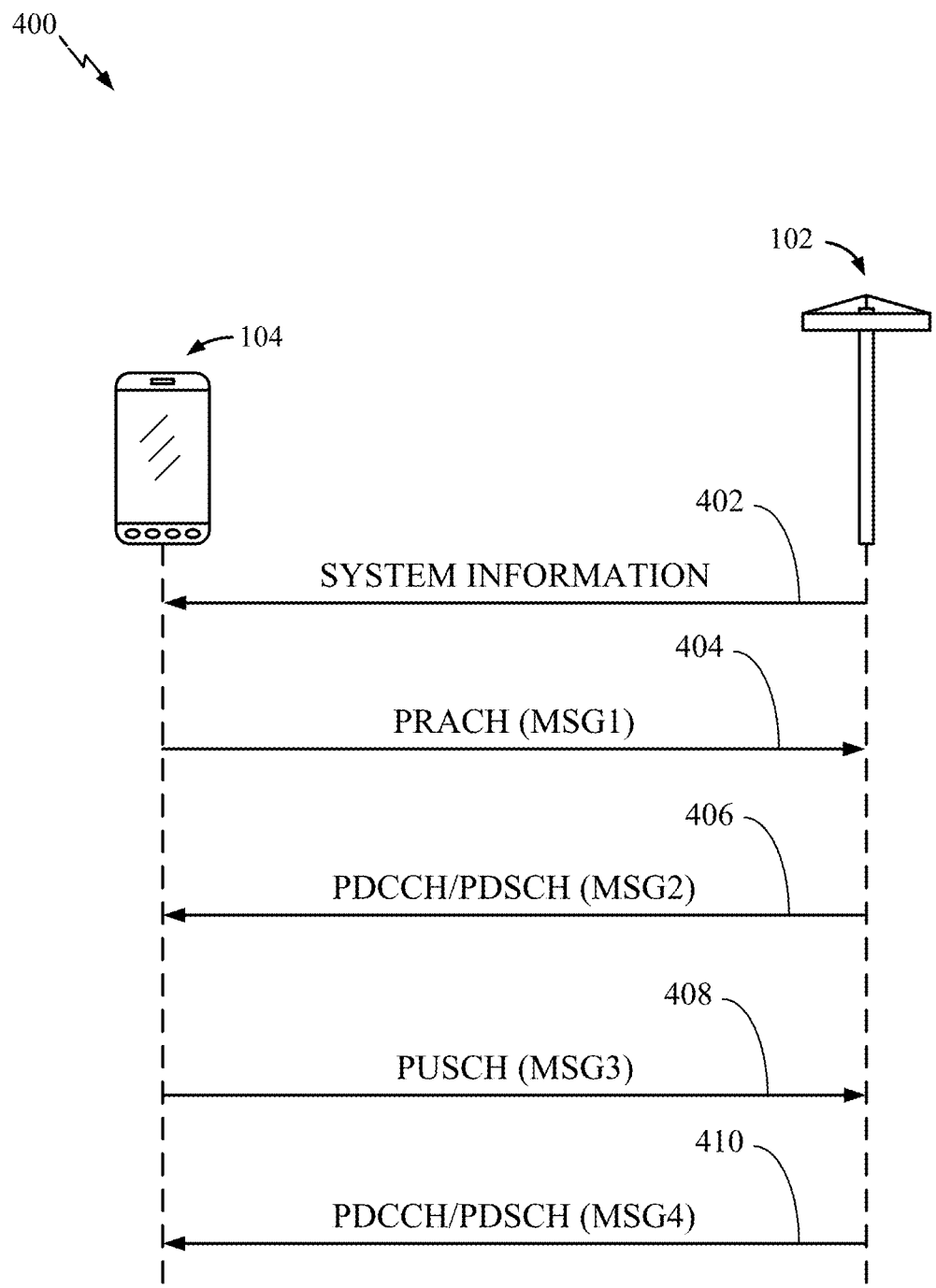
FIG. 4 is a call-flow diagram illustrating an example four-step RACH procedure, in accordance with certain aspects of the present disclosure.

FIG. 4 is a call-flow diagram 400 illustrating an example four-step RACH procedure, in accordance with certain aspects of the present disclosure. A first message (MSG1) may be sent from the UE 104 to BS 102 on the physical random access channel (PRACH). In this case, MSG1 may only include a RACH preamble 404. BS 102 may respond with a random access response (RAR) message 406 (MSG2) which may include the identifier (ID) of the RACH preamble, a timing advance (TA), an uplink grant, cell radio network temporary identifier (C-RNTI), and a back off indicator (BI). MSG2 may include a PDCCH communication including control information for (e.g., scheduling a reception of) a following communication on the PDSCH, as illustrated. In response to MSG2, MSG3 is transmitted from the UE 104 to BS 102 on the PUSCH 408. MSG3 may include one or more of an RRC connection request, a tracking area update request, a system information request, a positioning fix or positioning signal request, or a scheduling request. The BS 102 then responds with MSG4 which may include a contention resolution message 410. In some cases, the UE 104 may also receive system information 402 (e.g., also referred to herein as a system information message) indicating various communication parameters that may be used by the UE 104 for communicating with the BS 102.

Example Uplink Aspects for Narrowband Internet of Things

Certain aspects of the present disclosure are directed to techniques for using a modulation of coding scheme (MCS) associated with a modulation order of at least four for narrowband-internet of things (IoT) communication. One type of modulation and coding scheme (MCS) is 16-quadrature amplitude modulation (16-QAM) which may be configurable for several use cases. For example, 16-QAM based transmission may be configurable for certain narrowband physical uplink shared channel (NPUSCH) transmissions, yet not configurable for others. When 16-QAM is not configurable, legacy MCS and corresponding TBS may be used. Certain aspects of the present disclosure are directed to uplink transmissions (e.g., via NPUSCH) using an MCS associated with a modulation order of at least four, such as 16-QAM.

Figure 5:
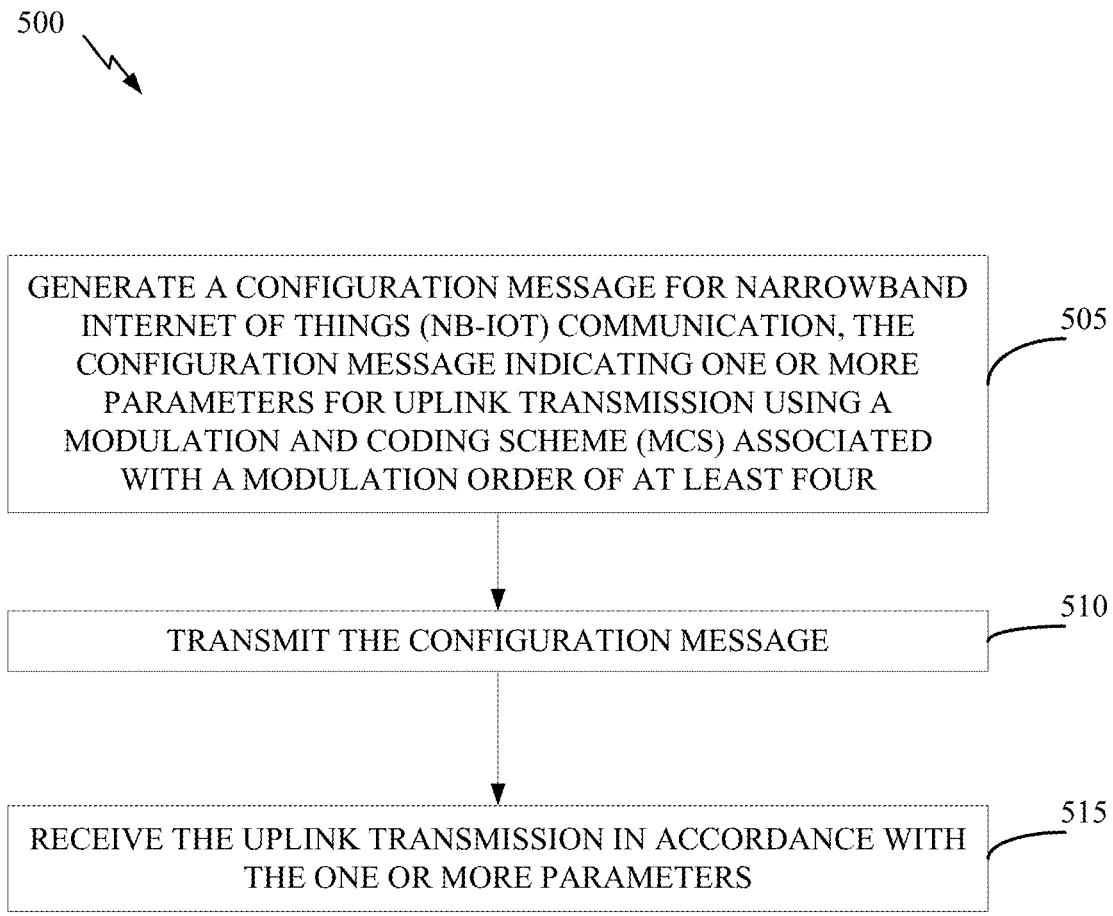
FIG. 5 is a flow diagram illustrating example operations for wireless communication by a BS, in accordance with certain aspects of the present disclosure.

FIG. 5 is a flow diagram illustrating example operations 500 for wireless communication, in accordance with certain aspects of the present disclosure. The operations 500 may be performed, for example, by a BS (e.g., such as the BS 110a in the wireless communication network 100).

Operations 500 may be implemented as software components that are executed and run on one or more processors (e.g., controller/processor 240 of FIG. 2). Further, the transmission and reception of signals by the BS in operations 500 may be enabled, for example, by one or more antennas (e.g., antennas 234 of FIG. 2). In certain aspects, the transmission and/or reception of signals by the BS may be implemented via a bus interface of one or more processors (e.g., controller/processor 240) obtaining and/or outputting signals.

The operations 500 may begin, at block 505, with the BS generating a configuration message for NB-IoT communication, the configuration message indicating one or more parameters for uplink transmission using a MCS (e.g., 16-QAM) associated with a modulation order of at least four. The configuration message may be any combination of higher layer RRC/MAC-CE (e.g., semi-static) signaling as well as physical layer DCI (e.g., dynamic) signaling. At block 510, the BS transmits the configuration message, and at block 515, receives the uplink transmission in accordance with the one or more parameters.

Figure 6:
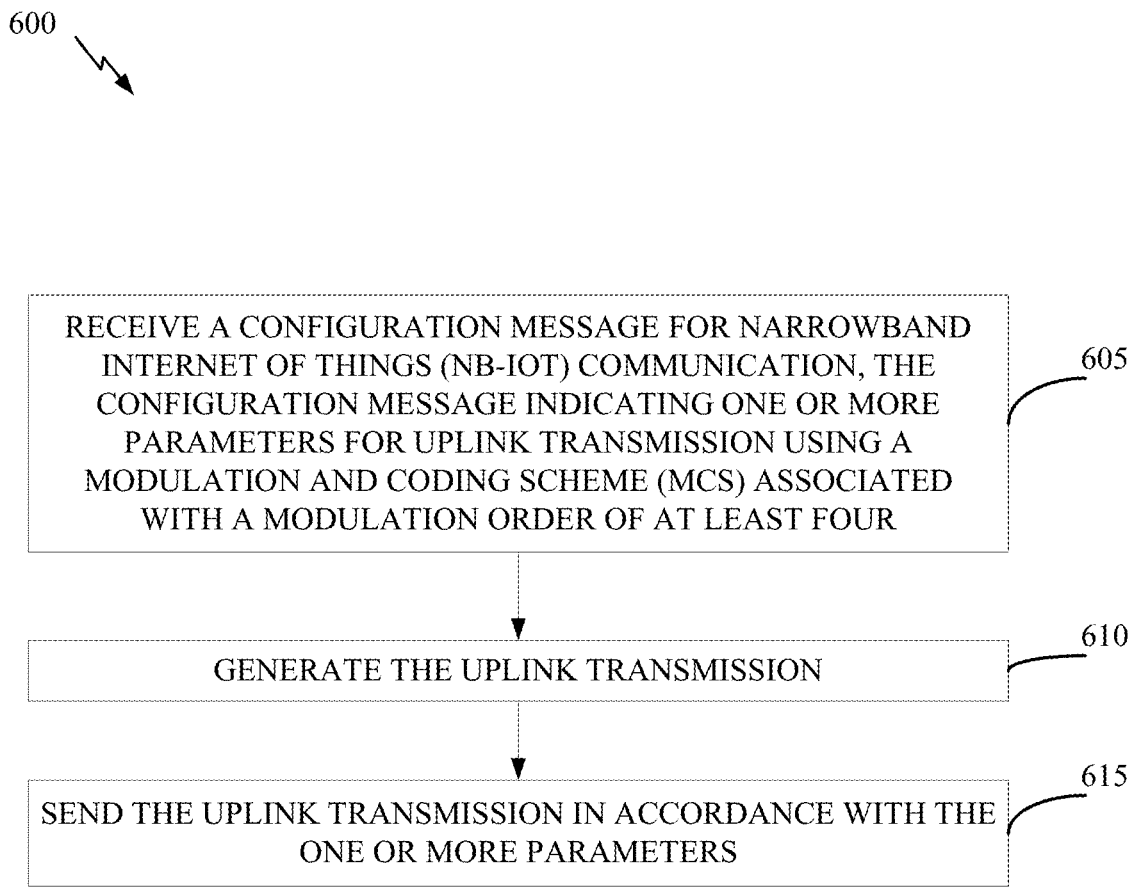
FIG. 6 is a flow diagram illustrating example operations for wireless communication by a UE, in accordance with certain aspects of the present disclosure.

FIG. 6 is a flow diagram illustrating example operations 600 for wireless communication, in accordance with certain aspects of the present disclosure. The operations 600 may be performed, for example, by UE (e.g., such as a UE 120a in the wireless communication network 100).

Operations 600 may be implemented as software components that are executed and run on one or more processors (e.g., controller/processor 280 of FIG. 2). Further, the transmission and reception of signals by the UE in operations 600 may be enabled, for example, by one or more antennas (e.g., antennas 252 of FIG. 2). In certain aspects, the transmission and/or reception of signals by the UE may be implemented via a bus interface of one or more processors (e.g., controller/processor 280) obtaining and/or outputting signals.

The operations 600 may begin, at block 605, with the UE receiving a configuration message for NB-IoT communication, the configuration message indicating one or more parameters for uplink transmission using a MCS (e.g., 16-QAM) associated with a modulation order of at least four. At block 610, the UE generates the uplink transmission, and at block 615, sends the uplink transmission in accordance with the one or more parameters.

As described herein, the base station may configure NPUSCH with 16-QAM in certain configuration scenarios. As an example, NPUSCH transmission may be configured with 16-QAM if NPUSCH (e.g., for usual data transmission) is associated with cell-C-RNTI except during random access. As an example, one or more fields of each of multiple candidate DCIs may be different based on a type of Radio Network Temporary Identifier (RNTI) associated with the candidate DCI. That is, DCI fields and their interpretation may be different for different types of RNTIs (e.g., SPS C-RNTI) that the DCI is associated with. For example, bits in a bitstream of DCI may be interpreted differently depending on an RNTI with which the DCI is associated with. For example, if DCI is associated with RNTI1, bits b0-b3 of the DCI may represent (e.g., decoded to indicate) MCS and bits b4-b7 may represent repetition number. However, for DCI associated with RNTI2, b0-b2 may represent (e.g., decoded to indicate) MCS, bits b3-b5 of the DCI may indicate repetition number, and bits b6-b7 may represent power control.

16-QAM may be configurable only for certain types of NPUSCH. For example, 16-QAM may only be a configurable (e.g., via DCI) for certain types of information, while not for others (e.g., may not be configurable if DCI is associated with SPS C-RNTI). In other words, a configuration message may include a DCI that is selected from a subset of candidate DCIs (e.g., candidate DCIs that are configurable for any MCS associated with the modulation order of at least two).

16-QAM may be not be configurable for NPUSCH transmission in certain implementations. For example, as described, 16-QAM may not be configurable for NPUSCH associated with semi-persistent scheduling (SPS) C-RNTI (uplink SPS, used for buffer status report (BSR)). 16-QAM may also not be configurable for NPUSCH Format 2 transmission (e.g., used for acknowledgement (ACK)/negative ACK (NACK)/scheduling request (SR)), NPUSCH with subcarrier spacing $\Delta f=3.75$ kHz (e.g., provided by a random access response (RAR)), non-early data transmission (EDT) message 3 (MSG3) NPUSCH in response to random access response, and NPUSCH scheduled by narrowband physical downlink control channel (NPDCCH) in a common search space. As an example, 16-QAM may be configurable only for certain subcarrier spacing configurations (e.g., 15 KHz), and not for others (e.g., 3.75 KHz). On the other hand, there may be separate configurability via higher layer signaling for enabling 16-QAM for different types of NPUSCH transmission. EDT is a feature where a UE may be given an uplink (UL) grant to transmit data in MSG3 of the random access process.

In certain aspects, whether 16-QAM-based NPUSCH is configured may depend on the number of transport blocks that are scheduled by the DCI. In certain implementations, a single DCI may schedule multiple transport blocks (TBs) (e.g., number of TBs field $N_{TB}>1$). In certain aspects, 16QAM-based NPUSCH may be only configurable when $N_{TB}=1$, and legacy NPUSCH (e.g., transmitted via Qm=2) may be configurable for $N_{TB}>1$. In other words, the configurability of 16-QAM may depend on the number of transport blocks ($N_{TB}$) configured.

In certain aspects, 16-QAM may be configurable for preconfigured uplink resources (PUR). PUR generally refers to resources that may be preconfigured (e.g., via RRC signaling) for uplink transmission in a first message (MSG1) of a random access procedure, allowing a UE to send data to a base station without having to complete the entire random access procedure involving communication of four messages (e.g., random access preamble message (MSG1), random access response (RAR) message (MSG2), contention request message (MSG3), and contention response message (MSG4), as described with respect to FIG. 4). PUR may allow for data transmission in MSG1 for UEs that have a valid timing advance and can be preconfigured to transmit messages directly from idle mode. Dedicated RRC signaling may be used in the PUR configuration process.

Certain aspects of the present disclosure are directed to a fall back procedure. For example, a UE may be configured with a 16-QAM-based PUR configuration and a legacy PUR configuration (e.g. for uplink transmission using an MCS associated with a modulation order of less than four (e.g., quadrature phase shift-keying (QPSK))). A UE upon failure to communicate using a 16QAM-based PUR configuration may fall back to the legacy PUR configuration. Alternatively, upon failure using i6QAM-based PUR configuration, a UE may fall back to using early data transmission (EDT) or legacy RACH process. As described herein, EDT is a feature where a UE may be given an UL grant to transmit data in MSG3 of the random access process. In other words, a UE may determine that an uplink transmission using an MCS associated with the modulation order of at least four has failed. The UE may then transmit another uplink transmission in response to the determination and via one or more configuration parameters for another MCS associated with a modulation order of less than four. The other uplink transmission may be via uplink resources for an EDT in a third message of another random access procedure or may be a transmission after the random access procedure.

Certain aspects provide techniques for configuration of 16-QAM for EDT. Per legacy procedures, during MSG1 and MSG3 transmissions of the random access process, it may not be possible for the base station to determine if the UE is capable of 16-QAM communication. For example, legacy EDT transmission may be limited to $\pi/4$-QPSK and QPSK depending on the content of the RAR message (MSG2). In certain aspects of the present disclosure, dedicated narrowband physical random access channel (NPRACH) resources may be configured that a 16-QAM-capable UE may use for random access, indicating to the base station that the UE is capable of 16-QAM NPUSCH. If the UE uses the resources associated with the MCS of 16-QAM for transmission of the random access preamble message (MSG1), the base station knows that the UE is 16-QAM capable, and may configure the UE accordingly via the corresponding RAR message (MSG2) transmitted by the base station in response to the random access preamble message.

16-QAM capable UEs may be configured to transmit EDT with 16-QAM. For example, the UE may use an EDT-16QAM table of MCS, TBS, number of resource units ($N_{RU}$) linked to the 16-QAM RACH resources, in conjunction with the RAR indicators such as MCS index. The interpretation of the RAR may be separately defined for when 16-QAM EDT is enabled. In other words, bits indicating MCS, TBS, and $N_{RU}$ may be interpreted using an EDT-16-QAM table if 16-QAM is configured. In some cases, for EDT, the table allows for a UE to select either the TBS an MCS is mapped to, or a limited set of smaller TBSs associated with a signaled TBS (e.g., mapped to MCS). The base station may then blindly decode for the (limited) different possibilities of TBSs that the UE may select. As used herein, a table generally refers to any indication of a mapping between parameters (e.g., a mapping between MCS and TBS, as described herein).

FIG. 7A is a table 700 illustrating a mapping between parameters such as MCS and TBS. In certain aspects, the EDT-16-QAM table may have fallback entries based on QPSK-based transmission. For example, as illustrated in FIG. 7A, the table 700 may be configured at the UE that maps candidate MCS indices to modulation order and TBS. The table 700 may include entries for both MCSs associated with modulation order 2 and MCSs associated with modulation order 4, as shown.

As described herein, the EDT-16-QAM may have entries for modulation order of four, as well as modulation order of 2 for fallback within the 16-QAM EDT structure (e.g., retransmission during MSG3). In other words, a UE that has EDT capability may receive an MCS entry in the EDT 16-QAM-table from the RAR (e.g., MSG2 of RACH), indicating QPSK (Qm=2) based transmission. In some cases, if the UE determines that it is failing to transmit data using the MCS it is being directed to use in the 16-QAM-EDT configuration, the UE may fall back to legacy EDT/legacy RACH procedure. In other words, the UE may use legacy EDT preamble to request, for example, lower MCS/TBS configurations, or forgo EDT all together and perform a 4-step RACH procedure to establish an RRC connection and transmit the data in a legacy fashion.

Certain aspects of the present disclosure are directed to power control techniques for 16-QAM configurations. Currently, power control for NB-IoT is open-loop. For example, there may be no power control command that is signaled dynamically via a DCI for NPUSCH transmission. Moreover, the equation used by a legacy NB-IoT UE to determine the transmit power for NPUSCH may not have a modulation order-specific term $\Delta_{TF}$. In certain aspects of the present disclosure, for 16-QAM based NPUSCH transmission, a power control term may be implemented for use by an NB-IoT UE supporting 16-QAM to determine transmission power of NPUSCH. For example, a closed loop power control term ($f_c$) may be signaled via DCI to the UE, the UE taking the closed loop power control term into account when determining a transmission power of the NPUSCH transmission. As another example, one or more specific open-loop power control terms (e.g., a specific nominal power term $P_0$ and/or a specific path loss compensation term $\alpha$) may be configured by higher layers (e.g., via RRC signaling) for 16-QAM based transmission. The one or more specific open-loop power control terms may be different from legacy configurations that use an MCS having, for example, a modulation order of 2.

In certain aspects of the present disclosure, a modulation-order (QPSK/BPSK) specific power control term $\Delta_{TF}$ may be introduced. In other words, $\Delta_{TF}$ may be used to adjust the transmit power depending on whether 16-QAM, QPSK, or binary phase shift keying (BPSK) is configured. In certain aspects, $\Delta_{TF}$ may not be present in power control equation if MCS entry indicates QPSK (or any MCS associated with a modulation order of less than four). In this manner, introduction of new terms to power control equation may be backwards compatible with legacy UEs. In other words, legacy UEs may continue to assume no $f_c$ or $\Delta_T r$ when determining uplink transmission power.

Certain aspects of the present disclosure are directed to scheduling constraints for 16-QAM configurations. 16-QAM-based NPUSCH may be best suited for good channel conditions. As a result, only certain resource allocation configurations (e.g., number of subcarriers ($n_{sc}$), number of resource units ($N_{RU}$), repetition number ($N_{rep}$)) with respect to legacy (e.g., an MCS using a modulation order of 2) may be configurable and signaled for use with 16-QAM.

Figure 7B:
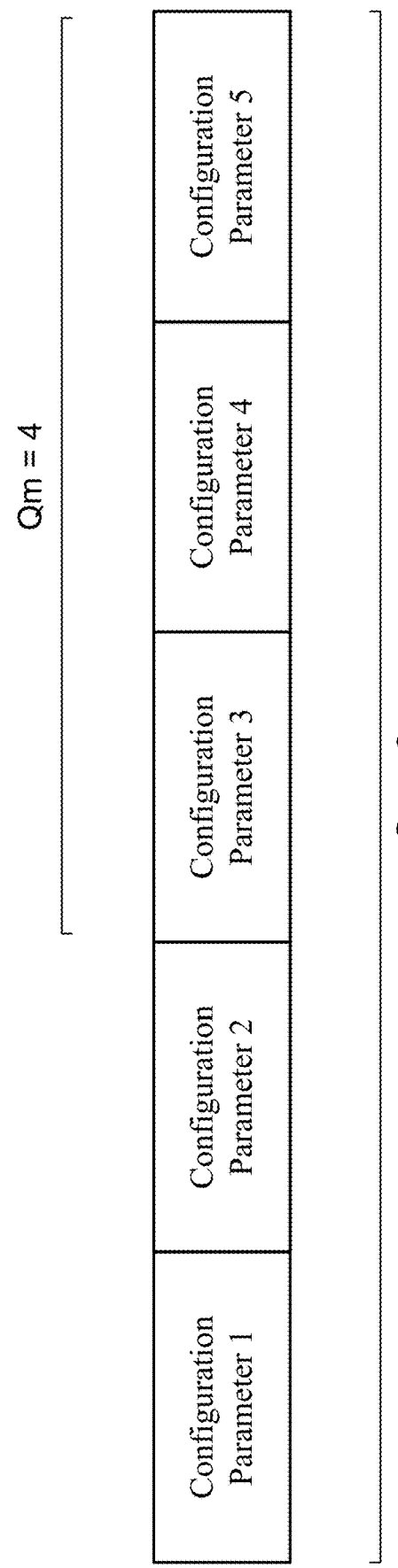
FIG. 7B illustrates candidate configuration parameters, in accordance with certain aspects of the present disclosure.

FIG. 7B illustrates candidate configuration parameters, in accordance with certain aspects of the present disclosure. In some aspects, resource allocation configurations for an MCS having a modulation order (Qm) of at least 4 (e.g., 16-QAM) may be a subset of the possible or allowed configurations in legacy (e.g., using an MCS having a modulation order of 2). For example, as illustrated, an MCS having a Qm of 2 may be configurable with one of candidate configuration parameters 1-5. As an example, the candidate configurations parameters may include candidate subcarrier spacing parameters, candidate number of repetitions, or candidate number of subcarriers parameters. On the other hand, 16-QAM may only be configured with a subset of the candidate configuration parameters (e.g., configuration parameters 3-5).

In some aspects, 16-QAM may only be configured when there is one repetition configured for NPUSCH or the number of repetitions is less than a threshold (e.g., $N_{rep}$ is 1). A high number of repetitions implies less than ideal channel quality, which may not be suitable for 16-QAM modulation that has a higher data rate as compared to, e.g., QPSK. As another example, 16-QAM may only be configured if full physical resource block (PRB) allocations are configured. In other words, the number of jointly valid combinations across ($Q_m$, $n_{sc}$, $N_{RU}$, $N_{rep}$) may be less for modulation order $Q_m=4$ (16QAM) than with legacy ($Q_m=2$). This may be represented in the specifications using any combination of Layer 1 (e.g., DCI), higher layer (e.g., RRC) signaling and jointly valid combinations defined in a standard.

Certain aspects are directed to techniques for signaling MCS/TBS tables for 16-QAM configurations. Conventionally, there may be a single MCS/TBS table for NPUSCH with entries for $Q_m=2$ (e.g., QPSK). In certain aspects of the present disclosure, for enabling 16-QAM, a table having entries with both $Q_m=2$ and $Q_m=4$ may be introduced, as illustrated in FIG. 6. The first few entries in the MCS table may correspond to $Q_m=2$ while the later entries may correspond to $Q_m=4$.

In certain aspects of the present disclosure, the UE may be configured (e.g., defined in a standard and stored in memory at UE) with different tables for different MCSs (e.g., 16-QAM) and may determine which MCS and TBS table to use to interpret the MCS entry signaled by DCI. For example, the MCS and TBS table to be used may be semi-statically configured by RRC signaling or via DCI signaling.

Certain aspects of the present disclosure are directed to joint encoding of MCS and one or more configuration parameters. For example, DCI may implicitly indicate the MCS and TBS table to be used for interpreting an MCS index. That is, the UE may read a (set of) field(s) in the DCI that is signaled independently. Depending on the value of this/these field(s), the UE may determine which MCS/TBS table to use, and interpret the other bits in the DCI based on the determination. As one example, conventionally, the number of subcarriers $n_{sc}$ may be signaled the same way irrespective of other bits in the DCI. If the number of subcarriers indicated by this field is above a threshold (e.g., $n_{sc}=6$), the UE may infer that the 16-QAM MCS/TBS table is to be used; else, the UE may infer that a legacy MCS/TBS table (and legacy DCI interpretation of other entries) is to be used. Similarly, $N_{rep}$ may be indicated using an independent field which implies the MCS and TBS table to be used. For example, an $N_{rep}$ indicating that one repetition is used for the uplink transmission implies that an MCS/TBS table for 16-QAM is to be used along with contingent interpretation of the remaining DCI bits.

Certain aspects of the present disclosure are directed to signaling of DCI. For example, the interpretation of (some) DCI bits in a DCI format (e.g., DCI Format N0) may be different from legacy depending on whether a UE is expected to transmit 16-QAM-based NPUSCH. Alternatively, a separate DCI format with a potentially different DCI size may be introduced. Certain aspects provide techniques for joint encoding of MCS and configuration parameters such as repetition number. As described herein, higher MCS entries (e.g., MCS associated with modulation order of at least four) may have less jointly valid options for various configuration parameters such as $N_{rep}$, $n_{sc}$, $N_{RU}$. As an example, if the MCS entry (e.g., in the MCS table to be used) indicates 16-QAM, the number of bits for the repetition number field may be reduced (e.g., from 3 bits to, for example, 1 or 0 bits). In other words, since the UE knows that only a limited number of repetitions are allowed for 16-QAM, the number of candidate repetitions may be reduced, allowing for a reduction of the number of bits used for the repetition number field. This may free up bits in the DCI design to signal other 16-QAM specific L1 control parameters, such as a 2 or 3-bit closed-loop power control parameter for NPUSCH, as described herein. A similar approach may be implemented for other fields, such as jointly encoding the resource assignment field (e.g., indicating the number of resource units (RUs)) and/or subcarrier indication field with MCS). Which (set of) DCI field(s) are jointly encoded may be dependent on whether the MCS/TBS tables are RRC-configured or implicitly signaled by DCI. In some examples, for implicit signaling via DCI, the independent field on which the MCS/TBS table is determined may not be jointly encoded with MCS.

As an example, if an MCS field (e.g., represented by bits b0-b3 of a message) indicates that modulation order of $Q_m=2$ to be used, then bits b4-b6 of the message may indicate a number of repetitions. Else, (e.g., MCS field indicates to use $Q_m=4$), then bit b4 may indicate the repetition number to be used and bits b5-b6 may indicate the closed-loop power control parameter $f_c$ to be used.

Figure 8:
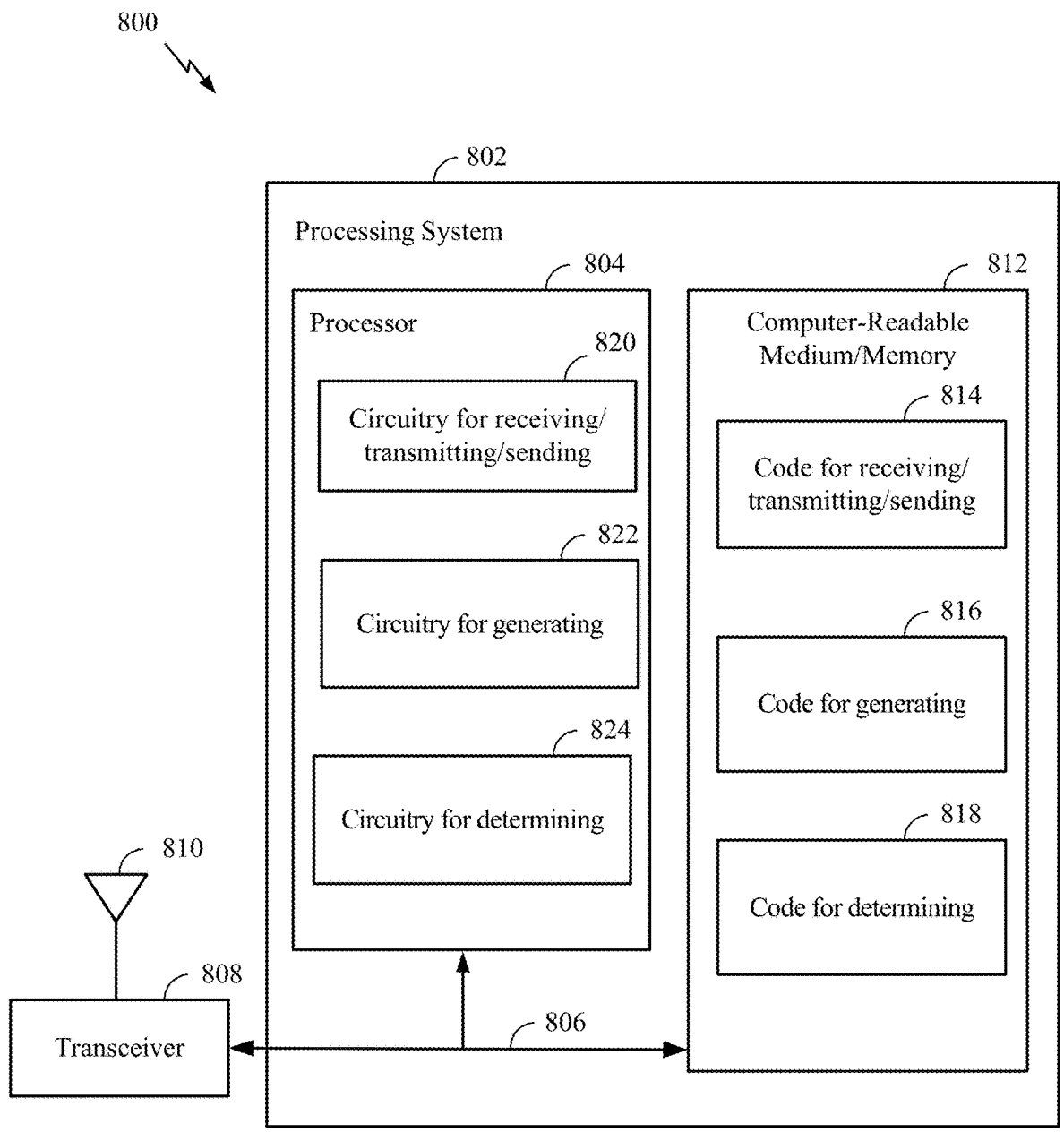
FIG. 8 illustrates a communications device that may include various components configured to perform operations for the techniques disclosed herein in accordance with aspects of the present disclosure.

FIG. 8 illustrates a communications device 800 that may include various components (e.g., corresponding to means-plus-function components) configured to perform operations for the techniques disclosed herein, such as the operations illustrated in FIGS. 5 and 6. The communications device 800 includes a processing system 802 coupled to a transceiver 808 (e.g., a transmitter and/or a receiver). The transceiver 808 is configured to transmit and receive signals for the communications device 800 via an antenna 810, such as the various signals as described herein. The processing system 802 may be configured to perform processing functions for the communications device 800, including processing signals received and/or to be transmitted by the communications device 800.

The processing system 802 includes a processor 804 coupled to a computer-readable medium/memory 812 via a bus 806. In certain aspects, the computer-readable medium/memory 812 is configured to store instructions (e.g., computer-executable code) that when executed by the processor 804, cause the processor 804 to perform the operations illustrated in FIGS. 5 and 6, or other operations for performing the various techniques discussed herein for NB-IoT communication. In certain aspects, computer-readable medium/memory 812 stores code 814 for receiving/transmitting/sending; code 816 for generating; and code 818 for determining. In certain aspects, the processor 804 has circuitry configured to implement the code stored in the computer-readable medium/memory 812. The processor 804 includes circuitry 820 for receiving/transmitting/sending; circuitry 822 for generating; and circuitry 824 for determining.

Example Aspects

Aspect 1. A method for wireless communication, comprising: receiving a configuration message for narrowband internet of things (NB-IoT) communication, the configuration message indicating one or more parameters for uplink transmission using a modulation and coding scheme (MCS) associated with a modulation order of at least four; generating the uplink transmission; and sending the uplink transmission in accordance with the one or more parameters.

Aspect 2. The method of aspect 1, wherein the uplink transmission is via preconfigured uplink resources (PUR) in a first message of a random access procedure.

Aspect 3. The method of aspect 2, wherein the configuration message is received via radio resource control (RRC) signaling indicating at least one parameter associated with the PUR to be used for the uplink transmission using the MCS associated with the modulation order of at least four.

Aspect 4. The method of any one of aspects 2-3, wherein the configuration message indicates: the PUR for the uplink transmission using the MCS associated with the modulation order of at least four; and other PUR for other uplink transmission, wherein the other uplink transmission uses another MCS associated with a modulation order of less than four.

Aspect 5. The method of aspect 4, further comprising: determining that the uplink transmission using the MCS associated with the modulation order of at least four has failed; and transmitting the other uplink transmission using the other MCS in response to the determination and via a first message of another random access procedure.

Aspect 6. The method of any one of aspects 2-5, wherein the configuration message indicates the PUR for the uplink transmission using the MCS associated with the modulation order of at least four, the method further comprising: determining that the uplink transmission using the MCS associated with the modulation order of at least four has failed; and transmitting another uplink transmission using the other MCS in response to the determination, the other uplink transmission being during a third message of another random access procedure or a transmission after the random access procedure.

Aspect 7. The method of aspect 1, wherein the uplink transmission is via uplink resources for an early data transmission (EDT) in a third message of a random access procedure.

Aspect 8. The method of aspect 7, further comprising transmitting a random access preamble message of the random access procedure using resources that indicate, to a base station, that the UE supports the MCS associated with the modulation order of at least four, wherein the configuration message comprises a random access response message transmitted in response to the random access preamble message.

Aspect 9. The method of aspect 8, wherein the indication of the one or more parameters in the random access response message is interpreted via a table associated with the MCS.

Aspect 10. The method of aspect 9, wherein the table maps each of a plurality of candidate MCSs to at least one transport block size (TBS) selectable by the UE.

Aspect 11. The method of any one of aspects 9-10, wherein the table further comprises one or more configuration parameters for another MCS associated with a modulation order of less than four.

Aspect 12. The method of any one of aspects 9-11, further comprising: determining that the uplink transmission using the MCS associated with the modulation order of at least four has failed; and transmitting another uplink transmission in response to the determination and via one or more configuration parameters for another MCS associated with a modulation order of less than four, wherein the other uplink transmission is via uplink resources for an EDT in a third message of another random access procedure or is a transmission after the random access procedure.

Aspect 13. The method of any one of aspects 1-12, further comprising: receiving, via downlink control information (DCI), an indication of a power control parameter for the uplink transmission using the MCS associated with the modulation order of at least four; and determining a transmit power for the uplink transmission based on the power control parameter.

Aspect 14. The method of any one of aspects 1-13, further comprising determining a transmit power for the uplink transmission based on one or more power control terms that are specific to the MCS to be used for the uplink transmission.

Aspect 15. The method of any one of aspects 1-14, further comprising receiving an indication of a table to use for interpreting the indication of the one or more parameters in the configuration message.

Aspect 16. The method of aspect 15, wherein the indication of the table is received via RRC signaling or downlink control information (DCI).

Aspect 17. The method of any one of aspects 15-16, wherein each of one or more DCI fields of the configuration message indicating the one or more parameters has fewer bits if the MCS of the uplink transmission has the modulation order of four as compared to a field indicating the one or more parameters for another uplink transmission having a modulation order of less than four.

Aspect 18. The method of any one of aspects 1-17, wherein the configuration message comprises DCI, and wherein the method further comprises determining a table to use for interpreting the indication of the one or more parameters based on one or more other parameters indicated by the DCI.

Aspect 19. The method of aspect 18, wherein the one or more other parameters comprise at least one of an indication of a number of subcarriers associated with the uplink transmission or a number of repetitions to be used for the uplink transmission.

Aspect 20. The method of any one of aspects 18-19, wherein the table maps each of a plurality of candidate MCSs to at least one transport block size (TBS).

Aspect 21. The method of any one of aspects 1-20, wherein the one or more parameters are constrained to be selected from a subset of candidate configuration parameters, the candidate configuration parameters being configurable for any MCS associated with a modulation order of two or higher.

Aspect 22. The method of any one of aspects 1-21, wherein the one or more parameters comprise a subcarrier spacing parameter that is selected from a subset of candidate subcarrier spacing parameters, the subset of the candidate subcarrier spacing parameters being the candidate subcarrier spacing parameters that are more than a subcarrier spacing threshold, the subcarrier spacing threshold corresponding to a subcarrier spacing that is allowed for transmissions using any MCS associated with a modulation order of two.

Aspect 23. The method of any one of aspects 1-22, wherein the one or more parameters comprise a number of repetitions parameter that is selected from a subset of candidate number of repetitions parameters, the subset of the candidate number of repetitions parameters being the candidate number of repetitions parameters that are less than a number of repetitions threshold, the number of repetitions threshold corresponding to a number of repetitions that is allowed for transmissions using any MCS associated with a modulation order of two.

Aspect 24. The method of any one of aspects 1-23, wherein the one or more parameters comprise a number of subcarriers parameter that is selected from a subset of candidate number of subcarriers parameters, the subset of the candidate number of subcarriers parameters being the candidate number of subcarriers parameters that are more than a number of subcarriers threshold.

Aspect 25. The method of any one of aspects 1-24, wherein the MCS comprises 16 quadrature amplitude modulation (16-QAM).

Aspect 26. The method of any one of aspects 1-25, wherein one or more fields of each of multiple candidate DCIs are different based on a type of Radio Network Temporary Identifier (RNTI) associated with the candidate DCI, and wherein the configuration message comprises a DCI that is selected from a subset of the multiple candidate DCIs, the multiple candidate DCIs being configurable for any MCS associated with the modulation order of at least two.

Aspect 27. The method of any one of aspects 1-26, wherein: the configuration message comprises an MCS field; if one or more bits of the MCS field indicates an MCS to be used that is associated with a modulation order of less than four, then a plurality of bits of the configuration message indicate a first parameter associated with the uplink transmission; and if the one or more bits of the MCS field indicates the MCS associated with the modulation order of at least four, the plurality of bits indicate the first parameter as well as one or more second parameters associated with the uplink transmission.

Aspect 28. The method of any one of aspects 1-27, wherein the configuration message comprises DCI, and wherein the MCS is configured via the DCI if a number of transport blocks configured via the DCI is less than a threshold, the threshold corresponding to a number of transport blocks configurable by a DCI that also configures any MCS associated with a modulation order of two.

Aspect 29. A method for wireless communication, comprising: generating a configuration message for narrowband internet of things (NB-IoT) communication, the configuration message indicating one or more parameters for uplink transmission using a modulation and coding scheme (MCS) associated with a modulation order of at least four; transmitting the configuration message; and receiving the uplink transmission in accordance with the one or more parameters.

Aspect 30. The method of aspect 29, wherein the uplink transmission is via preconfigured uplink resources (PUR) in a first message of a random access procedure.

Aspect 31. The method of aspect 30, wherein the configuration message is received via radio resource control (RRC) signaling indicating at least one parameters associated with the PUR to be used for the uplink transmission using the MCS associated with the modulation order of at least four.

Aspect 32. The method of any one of aspects 30-31, wherein the configuration message indicates: the PUR for the uplink transmission using the MCS associated with the modulation order of at least four; and other PUR for other uplink transmission, wherein the other uplink transmission uses another MCS associated with a modulation order of less than four.

Aspect 33. The method of aspect 32, further comprising receiving the other uplink transmission using the other MCS if the uplink transmission has failed, the other uplink transmission being via a first message of another random access procedure.

Aspect 34. The method of any one of aspects 30-33, wherein the configuration message indicates the PUR for the uplink transmission using the MCS associated with the modulation order of at least four, the method further comprising: transmitting another uplink transmission using the other MCS if the uplink transmission has failed, the other uplink transmission being during a third message of another random access procedure or a transmission after the random access procedure.

Aspect 35. The method of any one of aspects 29-34, wherein the uplink transmission is via uplink resources for an early data transmission (EDT) in a third message of a random access procedure.

Aspect 36. The method of aspect 35, further comprising receiving a random access preamble message of the random access procedure using resources that indicate that the UE supports the MCS associated with the modulation order of at least four, wherein the configuration message comprises a random access response message transmitted in response to the random access preamble message.

Aspect 37. The method of aspect 36, wherein the indication of the one or more parameters in the random access response message is interpreted via a table associated with the MCS.

Aspect 38. The method of aspect 37, wherein the table maps each of a plurality of candidate MCSs to at least one transport block size (TBS).

Aspect 39. The method of any one of aspects 37-38, wherein the table further comprises one or more configuration parameters for another MCS associated with a modulation order of less than four, the method further comprising: receiving another uplink transmission if the uplink transmission has failed, the other uplink transmission being via the one or more configuration parameters for the other MCS.

Aspect 40. The method of any one of aspects 37-39, further comprising: determining that the uplink transmission using the MCS associated with the modulation order of at least four has failed; and receiving another uplink transmission if the uplink transmission has failed, the other uplink transmission being via one or more configuration parameters for another MCS associated with a modulation order of less than four, wherein the other uplink transmission is via uplink resources for an EDT in a third message of another random access procedure or is a transmission after the random access procedure.

Aspect 41. The method of any one of aspects 29-40, further comprising transmitting, via downlink control information (DCI), an indication of a power control parameter for the uplink transmission using the MCS associated with the modulation order of at least four.

Aspect 42. The method of any one of aspects 29-41, further comprising transmitting an indication of a table to use for interpreting the indication of the one or more parameters in the configuration message.

Aspect 43. The method of aspect 42, wherein the indication of the table is transmitted via RRC signaling or downlink control information (DCI).

Aspect 44. The method of any one of aspects 42-43, wherein each of one or more DCI fields of the configuration message indicating the one or more parameters has fewer bits if the MCS of the uplink transmission has the modulation order of four as compared to a field indicating the one or more parameters for another uplink transmission having a modulation order of less than four.

Aspect 45. The method of any one of aspects 29-44, wherein the configuration message comprises DCI, and wherein a table to be use for interpreting the indication of the one or more parameters is to be determined based on one or more other parameters indicated by the DCI.

Aspect 46. The method of aspect 45, wherein the one or more other parameters comprise at least one of an indication of a number of subcarriers associated with the uplink transmission or a number of repetitions to be used for the uplink transmission.

Aspect 47. The method of any one of aspects 45-46, wherein the table maps each of a plurality of candidate MCSs to at least one transport block size (TBS).

Aspect 48. The method of any one of aspects 29-47, wherein the one or more parameters are constrained to be selected from a subset of candidate configuration parameters, the candidate configuration parameters being configurable for any MCS associated with a modulation order of two or higher.

Aspect 49. The method of any one of aspects 29-48, wherein the one or more parameters comprise a subcarrier spacing parameter, the method further comprising selecting the subcarrier spacing parameter from a subset of candidate subcarrier spacing parameters, the subset of the candidate subcarrier spacing parameters being the candidate subcarrier spacing parameters that are more than a subcarrier spacing threshold, the subcarrier spacing threshold corresponding to a subcarrier spacing that is allowed for transmissions using any MCS associated with a modulation order of two.

Aspect 50. The method of any one of aspects 29-49, wherein the one or more parameters comprise a number of repetitions parameter, the method further comprising selecting the number of repetitions parameter from a subset of candidate number of repetitions parameters, the subset of the candidate number of repetitions parameters being the candidate number of repetitions parameters that are less than a number of repetitions threshold, the number of repetitions threshold corresponding to a number of repetitions that is allowed for transmissions using any MCS associated with a modulation order of two.

Aspect 51. The method of any one of aspects 29-50, wherein the one or more parameters comprise a number of subcarriers parameter, the method further comprising selecting the number of subcarriers parameter from a subset of candidate number of subcarriers parameters, the subset of the candidate number of subcarriers parameters being the candidate number of subcarriers parameters that are more than a number of subcarriers threshold.

Aspect 52. The method of any one of aspects 29-51, wherein the MCS comprises 16 quadrature amplitude modulation (16-QAM).

Aspect 53. The method of any one of aspects 29-52, wherein the configuration message comprises DCI, wherein one or more fields of each of multiple candidate DCIs are different based on a type of RNTI associated with the candidate DCI, and wherein the method further comprises selecting the DCI from a subset of the multiple candidate DCIs, the multiple candidate DCIs being configurable for any MCS associated with the modulation order of at least two.

Aspect 54. The method of any one of aspects 29-53, wherein: the configuration message comprises an MCS field; if one or more bits of the MCS field indicates an MCS to be used that is associated with a modulation order of less than four, then a plurality of bits of the configuration message indicate a first parameter associated with the uplink transmission; and if the one or more bits of the MCS field indicates the MCS associated with the modulation order of at least four, the plurality of bits indicate the first parameter as well as one or more second parameters associated with the uplink transmission.

Aspect 55. The method of any one of aspects 29-54, wherein the configuration message comprises DCI, and wherein the method further comprises determining whether to configure the MCS associated with the modulation order of at least four via the DCI based on whether a number of transport blocks configured via the DCI is less than a threshold, the threshold corresponding to a number of transport blocks configurable by a DCI that also configures any MCS associated with a modulation order of two.

The techniques described herein may be used for various wireless communication technologies, such as NR (e.g., 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

In 3GPP, the term "cell" can refer to a coverage area of a Node B (NB) and/or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

In some examples, access to the air interface may be scheduled. A scheduling entity (e.g., a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein, for example, instructions for performing the operations described herein and illustrated in FIGS. 5 and 6.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

The invention claimed is:

1. An apparatus for wireless communication, comprising:
a memory comprising executable instructions; and
one or more processors configured to execute the executable instructions and cause the apparatus to:
receive a configuration message for narrowband internet of things (NB-IoT) communication, the configuration message indicating one or more parameters for uplink transmission using a modulation and coding scheme (MCS) associated with a modulation order of at least four;
generate the uplink transmission; and
transmit, in accordance with the one or more parameters, the uplink transmission via preconfigured uplink resources (PUR) in a first message of a random access procedure.

2. The apparatus of claim 1, wherein the configuration message is received via radio resource control (RRC) signaling indicating at least one parameter associated with the PUR to be used for the uplink transmission using the MCS associated with the modulation order of at least four.

3. The apparatus of claim 1, wherein the configuration message indicates:
the PUR for the uplink transmission using the MCS associated with the modulation order of at least four; and
other PUR for other uplink transmission, wherein the other uplink transmission uses another MCS associated with a modulation order of less than four.

4. The apparatus of claim 3, wherein the one or more processors are further configured to cause the apparatus to:
determine that the uplink transmission using the MCS associated with the modulation order of at least four has failed; and
transmit the other uplink transmission using the other MCS in response to the determination and via a first message of another random access procedure.

5. The apparatus of claim 1, wherein the configuration message indicates the PUR for the uplink transmission using the MCS associated with the modulation order of at least four, and wherein the memory and the one or more processors are further configured to:
determine that the uplink transmission using the MCS associated with the modulation order of at least four has failed; and
transmit another uplink transmission using the other MCS in response to the determination, the other uplink transmission being during a third message of another random access procedure or a transmission after the random access procedure.

6. The apparatus of claim 1, the one or more processors are further configured to cause the apparatus to transmit a second uplink transmission via uplink resources for an early data transmission (EDT) in a third message of a random access procedure.

7. The apparatus of claim 6, wherein the one or more processors are further configured to cause the apparatus to transmit a random access preamble message of the random access procedure using resources that indicate, to a base station, that the UE supports the MCS associated with the modulation order of at least four, wherein the configuration message comprises a random access response message transmitted in response to the random access preamble message.

8. The apparatus of claim 7, wherein the indication of the one or more parameters in the random access response message is interpreted via a table associated with the MCS.

9. The apparatus of claim 8, wherein the table maps each of a plurality of candidate MCSs to at least one transport block size (TBS) selectable by the UE.

10. The apparatus of claim 8, wherein the table further comprises one or more configuration parameters for another MCS associated with a modulation order of less than four.

11. The apparatus of claim 8, wherein the one or more processors are further configured to cause the apparatus to:
determine that the second uplink transmission using the MCS associated with the modulation order of at least four has failed; and
transmit a third uplink transmission in response to the determination and via one or more configuration parameters for another MCS associated with a modulation order of less than four, wherein the third uplink transmission is via uplink resources for an EDT in a third message of another random access procedure or is a transmission after the random access procedure.

12. An apparatus for wireless communication, comprising:
a memory comprising executable instructions; and
one or more processors configured to execute the executable instructions and cause the apparatus to:
generate a configuration message for narrowband internet of things (NB-IoT) communication, the configuration message indicating one or more parameters for uplink transmission using a modulation and coding scheme (MCS) associated with a modulation order of at least four;
transmit the configuration message; and
receive, in accordance with the one or more parameters, the uplink transmission via preconfigured uplink resources (PUR) in a first message of a random access procedure.

13. The apparatus of claim 12, wherein the one or more processor are further configured to cause the apparatus to receive a second uplink transmission via uplink resources for an early data transmission (EDT) in a third message of a random access procedure.

14. The apparatus of claim 12, wherein the one or more processors are further configured to cause the apparatus to transmit an indication of a table to use for interpreting the indication of the one or more parameters in the configuration message.

15. A method for wireless communication, comprising:
receiving a configuration message for narrowband internet of things (NB-IoT) communication, the configuration message indicating one or more parameters for uplink transmission using a modulation and coding scheme (MCS) associated with a modulation order of at least four;
generating the uplink transmission; and
transmitting, in accordance with the one or more parameters, the uplink transmission via preconfigured uplink resources (PUR) in a first message of a random access procedure.

16. The method of claim 15, further comprising:
receiving, via downlink control information (DCI), an indication of a power control parameter for the uplink transmission using the MCS associated with the modulation order of at least four; and
determining a transmit power for the uplink transmission based on the power control parameter.

17. The method of claim 15, further comprising determining a transmit power for the uplink transmission based on one or more power control terms that are specific to the MCS to be used for the uplink transmission.

18. The method of claim 15, further comprising receiving an indication of a table to use for interpreting the indication of the one or more parameters in the configuration message.

19. The method of claim 18, wherein the indication of the table is received via RRC signaling or downlink control information (DCI).

20. The method of claim 18, wherein each of one or more DCI fields of the configuration message indicating the one or more parameters has fewer bits if the MCS of the uplink transmission has the modulation order of four as compared to a field indicating the one or more parameters for another uplink transmission having a modulation order of less than four.

21. The method of claim 15, wherein the configuration message comprises DCI, and the method further comprises determining a table to use for interpreting the indication of the one or more parameters based on one or more other parameters indicated by the DCI.

22. The method of claim 21, wherein the one or more other parameters comprise at least one of an indication of a number of subcarriers associated with the uplink transmission or a number of repetitions to be used for the uplink transmission.

23. The method of claim 21, wherein the table maps each of a plurality of candidate MCSs to at least one transport block size (TBS).

24. The method of claim 15, wherein the one or more parameters are constrained to be selected from a subset of candidate configuration parameters, the candidate configuration parameters being configurable for any MCS associated with a modulation order of two or higher.

25. The method of claim 15, wherein the one or more parameters comprise a subcarrier spacing parameter that is selected from a subset of candidate subcarrier spacing parameters, the subset of the candidate subcarrier spacing parameters being the candidate subcarrier spacing parameters that are more than a subcarrier spacing threshold, the subcarrier spacing threshold corresponding to a subcarrier spacing that is allowed for transmissions using any MCS associated with a modulation order of two.

26. The method of claim 15, wherein the one or more parameters comprise a number of repetitions parameter that is selected from a subset of candidate number of repetitions parameters, the subset of the candidate number of repetitions parameters being the candidate number of repetitions parameters that are less than a number of repetitions threshold, the number of repetitions threshold corresponding to a number of repetitions that is allowed for transmissions using any MCS associated with a modulation order of two.

27. The method of claim 15, wherein the one or more parameters comprise a number of subcarriers parameter that is selected from a subset of candidate number of subcarriers parameters, the subset of the candidate number of subcarriers parameters being the candidate number of subcarriers parameters that are more than a number of subcarriers threshold.

28. The method of claim 15, wherein one or more fields of each of multiple candidate DCIs are different based on a type of Radio Network Temporary Identifier (RNTI) associated with the candidate DCI, and wherein the configuration message comprises a DCI that is selected from a subset of the multiple candidate DCIs, the multiple candidate DCIs being configurable for any MCS associated with the modulation order of at least two.

29. The method of claim 15, wherein:
the configuration message comprises an MCS field;
if one or more bits of the MCS field indicates an MCS to be used that is associated with a modulation order of less than four, then a plurality of bits of the configuration message indicate a first parameter associated with the uplink transmission; and
if the one or more bits of the MCS field indicates the MCS associated with the modulation order of at least four, the plurality of bits indicate the first parameter as well as one or more second parameters associated with the uplink transmission.

30. The method of claim 15, wherein the configuration message comprises DCI, and wherein the MCS is configured via the DCI if a number of transport blocks configured via the DCI is less than a threshold, the threshold corresponding to a number of transport blocks configurable by a DCI that also configures any MCS associated with a modulation order of two.

31. A method for wireless communication, comprising:
generating a configuration message for narrowband internet of things (NB-IoT) communication, the configuration message indicating one or more parameters for uplink transmission using a modulation and coding scheme (MCS) associated with a modulation order of at least four;
transmitting the configuration message; and
receiving, in accordance with the one or more parameters, the uplink transmission via preconfigured uplink resources (PUR) in a first message of a random access procedure.

32. The method of claim 31, further comprising transmitting, via downlink control information (DCI), an indication of a power control parameter for the uplink transmission using the MCS associated with the modulation order of at least four.

33. The method of claim 31, wherein the one or more parameters are constrained to be selected from a subset of candidate configuration parameters, the candidate configuration parameters being configurable for any MCS associated with a modulation order of two or higher.

* * * * *